Oct. 15, 1940.　　　P. C. BOEHME　　　2,217,656
ADJUSTABLE COLLAR
Filed Oct. 10, 1939
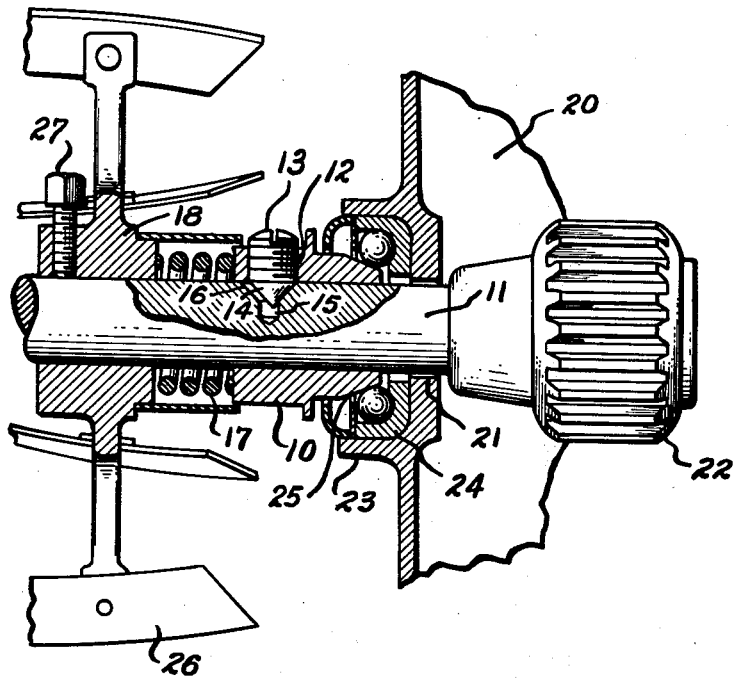
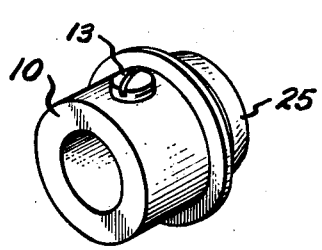
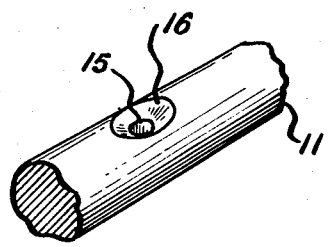
INVENTOR.
PAUL CHARLES BOEHME.
BY
ATTORNEYS.

Patented Oct. 15, 1940

2,217,656

UNITED STATES PATENT OFFICE 2,217,656

ADJUSTABLE COLLAR

Paul Charles Boehme, Cincinnati, Ohio

Application October 10, 1939, Serial No. 298,825

5 Claims. (Cl. 308—197)

This invention relates to adjustable collars and while it is applicable to many uses, it will be described particularly in connection with the adjustment of a bearing collar on a lawnmower. It will be understood that this particular application has been selected merely because it is one of many in which the collar has great utility and that other uses will suggest themselves to one skilled in the art.

Numerous different types of collars are available for applications of this sort but all have had one or more objectionable features. In some the adjustment of the collar requires the manipulation of two adjusting screws while in others adjustment of the collar produces a slight cocking of the collar with respect to the shaft which renders the adjustment objectionable for certain uses.

It is an object of my invention, therefore, to provide an adjustable collar which will be free from the above mentioned objections. Adjustment is accomplished by means of a single adjusting screw which may be turned in one direction to produce movement of the collar in one direction and in the other direction for producing movement of the collar in the other direction. The adjustment does not produce a cocking of the collar with respect to the shaft and the construction in general is of the utmost simplicity.

These and other objects of my invention which will be pointed out in more detail hereinafter or which will be apparent to one skilled in the art upon reading these specifications, I accomplish by that certain construction and arrangement of parts of which I shall now describe an exemplary embodiment. Reference is made to the drawing in which:

Figure 1 is a detailed sectional view showing a collar according to my invention as applied to the adjustment of a taper bearing in an ordinary lawnmower.

Figure 2 is a perspective view of the collar.

Figure 3 is a partial perspective view of the shaft showing the adjusting seat.

Briefly, in the practice of my invention, I provide a collar indicated generally at 10 which collar is adapted to be carried on the shaft 11. The collar has a threaded hole 12 into which is threaded the adjusting screw 13. The screw 13 has a tapered or conical point 14.

The shaft 11 is drilled as at 15 and countersunk as at 16 to provide a seat for the screw 13. It will be observed that the countersink 16 is larger than the conical tip 14 of the screw 13. The taper of the countersink 16 will preferably though not necessarily be the same as the taper of the conical tip 14.

A compression spring 17 is disposed against the collar 10 and around the shaft 11 with its other end bearing against some element which is fixed to the shaft as for example the spider 18.

It will now be clear that the spring 17 urges the collar toward the right in Figure 1, the limit of movement toward the right being defined by the position of the adjusting screw 13. It will be clear that as the adjusting screw 13 is withdrawn, further movement toward the right becomes possible and that as the screw 13 is turned in the opposite direction the collar 10 will be forced toward the left against the pressure of the spring 17. It will be understood that the limits of adjustment are defined by the depth and taper of the countersink 16 and the shape of the tip 14 while the delicacy of adjustment will be partly dependent upon those factors and also upon the pitch of the thread of the screw 13.

In the particular application shown in Figure 1 20 represents a portion of the lawnmower frame having a hole 21 through which the shaft 11 extends. The shaft 11 carries on its outer end the pinion 22 which will mesh with the usual internal gear mounted on the lawnmower wheel. Surrounding the hole 21 is a flange 23 within which is seated a conventional ball bearing unit generally indicated at 24. The other element of the bearing is constituted by the tapered end 25 of the collar 10. The spider 18 is one of the several spiders on the arms of which are mounted the blades 26. The spider is held in position on the shaft by means of the set screw 27.

In the application shown therefore the bearing between the tapered end 25 of the collar 10 and the balls of the ball bearing unit 24 is accomplished by adjustment of the screw 13.

It will be understood that numerous modifications of my invention may be made without departing from the spirit thereof and that the adjustable collar will find application in numerous mechanisms. I therefore do not intend to limit myself except as pointed out in the claims which follow.

Having now fully described my invention, what I claim as new and desire to secure by Letters Patent is:

1. In combination with a shaft having a fixed abutment and a collar on said shaft, means for adjusting the position of said collar along said shaft comprising a spring encircling said shaft between said abutment and said collar, a conical recess in said shaft, and an adjusting screw threaded in said collar and having a conical tip extending into said conical recess.

2. In combination with a shaft having a fixed abutment and a collar on said shaft, means for adjusting the position of said collar along said shaft comprising a spring encircling said shaft between said abutment and said collar, a conical recess in said shaft, and an adjusting screw threaded in said collar and having a conical tip extending into said conical recess, said conical recess being greater in extent than the conical tip of said adjusting screw.

3. In combination with a shaft having a fixed abutment and a collar on said shaft, means for adjusting the position of said collar along said shaft comprising a spring encircling said shaft between said abutment and said collar, a conical recess in said shaft, and an adjusting screw threaded in said collar and having a conical tip extending into said conical recess, said conical recess being greater in extent than the conical tip of said adjusting screw, the angles of said conical recess and tip being equal.

4. A bearing structure comprising a frame having an aperture therein, a ball bearing fixed to said frame about said aperture, a shaft passing through said aperture and carrying a collar, said collar having a tapered end arranged to cooperate with the balls of said ball bearing, and means for adjusting said collar along said shaft comprising a spring encircling said shaft between said abutment and said collar, a conical recess in said shaft, and an adjusting screw threaded in said collar and having a conical tip extending into said conical recess.

5. An adjustment for a lawnmower shaft bearing collar comprising a spring surrounding said shaft, one end of said spring bearing against said collar, a fixed abutment for the other end of said spring, a threaded hole in said collar, a set screw threaded in said hole, said set screw having a conical tip and said shaft having a conical recess, said recess being of greater extent than said tip, the rotation of said adjusting screw being adapted to produce axial adjustment of said bearing collar.

PAUL CHARLES BOEHME.